Nov. 7, 1961  A. H. LICHTER  3,007,737
SEAT CONSTRUCTION
Filed May 27, 1959
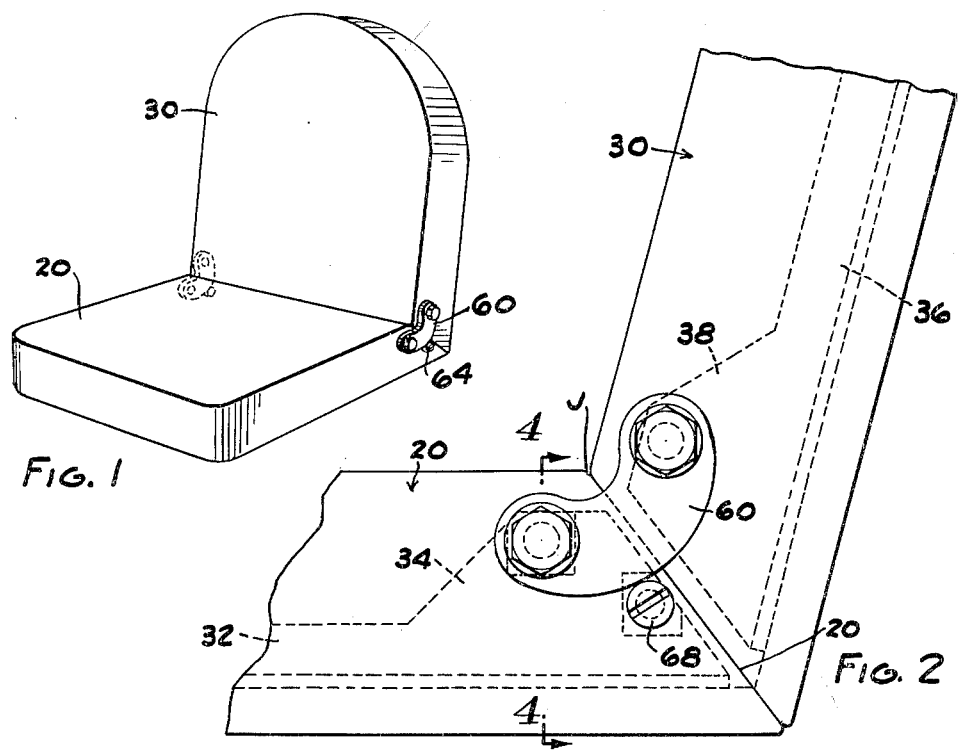
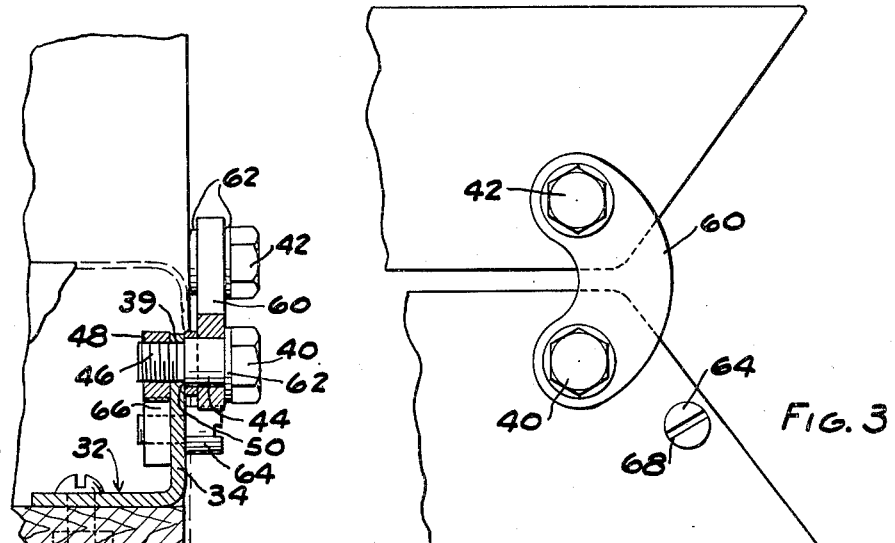
FIG. 4
INVENTOR.
ADOLPH H. LICHTER
BY
Barnes, Kisselle, Raisch & Choate
ATTORNEYS

United States Patent Office 3,007,737
Patented Nov. 7, 1961

3,007,737
SEAT CONSTRUCTION
Adolph H. Lichter, 5062 Lorain, Detroit, Mich.
Filed May 27, 1959, Ser. No. 816,326
12 Claims. (Cl. 297—378)

This application relates to a seat construction and is particularly adapted to a seat construction for pleasure boats and other marine craft.

It is an object of the invention to provide a seat construction which has an extremely rigid frame arrangement which provides a back which can be folded down when not in use against the horizontal portion of the seat.

In previous constructions, it has been common to have an extremely bulky hinge device which has projected across the angle of the seat at the corner thereof in a manner to create an obstruction which proved to be uncomfortable especially in a marine construction if the motion of the boat was causing a person using the seat to slide back and forth. Such a hinge also created an obstruction to a person who was mounting the seat from the side or demounting toward a side.

It is an object of the present invention to provide a seat with a hinge construction which avoids the necessity of a heavy central pivot and which lies entirely within the confines of the side edges of the seat so that the seat portion itself is entirely clear at the sides.

It is a further object to provide a very compact and neat hinge construction which is extremely simple and inexpensive and yet one which provides great rigidity for the seat back when it is in upright position.

It is also an object to have a hinge construction lying completely within the confines of the seat whether in folded or upright position. In many installations, in boats and other vehicles, the seats are collapsed to hang on the side of the vehicle in unused position. The present construction avoids any annoying or dangerous projections beyond the contours of the seat regardless of its position.

Other objects and features of the invention relating to details of construction and operation will be apparent in the following description and claims.

Drawings accompany the disclosure and the various views thereof may be briefly described as:

FIGURE 1, a perspective view of the seat showing the back in upright position.

FIGURE 2, a detailed enlargement of the corner construction of the seat.

FIGURE 3, a view showing the seat in folded position.

FIGURE 4, a sectional view on line 4—4 of FIGURE 2.

Referring to the drawings, a seat construction is shown having a horizontal seat pad portion 20 and a seat back portion 30. These two portions of the seat are formed in a standard fashion with suitable frame work and upholstering and covering, it being essential that, adjacent the back corners of the seat portions where they are joined, there be frame portions of reinforced wood or metal within the upholsery which serve as anchors for the hinge to be described.

In FIGURE 2 a suitable angled frame member 32 for the base of the seat is shown having an upstanding lug portion 34; for the seat back an angled frame member 36 is shown, having a lug portion 38. The lug portions are mitered at the joining ends and also the seat portions 20 and 30 have a mitered construction at the back edges of the seat portion 20 and the lower edge of the seat portion 30 so that the edges of the seat abut to position the back in upright position.

The lug portions 34 and 38 are provided with holes 39 to receive bolts 40 and 42, these bolts having a cylindrical shank portion 44 and a threaded portion 46 to receive a nut 48. If desired, the nut portion 48 may be fastened to the inner frame member so that the bolt may be manipulated completely from the outside of the seat. The shoulder 50 at the end of the cylindrical portion 44 permits the bolt to be tightened up securely on the frame member without binding the hinge structure.

The bolts 40 and 42 serve to hold a link hinge member 60 which is essentially a C-shaped member having a curved contour to give it a somewhat kidney-like shape. The shape of the link could be a straight formation or an L-shape. However, the hinge shown in the drawings is one which has an attractive appearance and which functions quite effectively in connection with the assembly as will be described. The hinge members are apertured to receive the cylindrical portion 44 of the bolts and suitable washers 62 are provided around the bolt shanks to separate the hinge member from the seat portions. Both of the joints on the bolts 40 and 42 are intended to be free so that when the seat back 30 is folded down as shown in FIGURE 3 both pivot points can move.

Anchored in the frame member 32 below and to the rear of the bolt 40 is a screw stud 64 held in place by a suitable threaded nut 66. Again the nut 66 can be fastened, that is, for example, welded directly, to the rear surface of the angle frame member 32 and the stud is manipulated by the screw driver slot 68.

It will be seen that as the hinge member 60 rocks back to its position where the back portion 30 is upright, the rear curved surface of the hinge 60 rocks back into contact with the solid stud 64, thus serving somewhat as a stop in conjunction with the contact of the mitered edges of the seats at 70. Actually the stud 64 serves primarily to support the vertical weight of the back cushion since the mitered edges of the cushion serve as the primary stop and pressure area for the two parts of the seat.

The construction as illustrated is arranged to permit easy lowering of th seat to the folded position and also it will be seen that when the seat is in upright position all parts of the hinge are displaced from the seat portions contacted by or likely to be contacted by the posterior of an occupant of the seat. Specifically, the double pivot arrangement enables hinge links 60 to be completely displaced from the juncture J between seating portions of the cushions and eliminates the projection beyond that juncture into the seating area of the single central pivot found in conventional structures.

Also the flat, double-pivot device avoids any heavy bolt or corner pivot which would project outwardly from the side of the seat construction.

I claim:

1. In a seat having a horizontal cushion and a back cushion hinged thereto for movement selectively to an erect position for use and a folded position overlying said horizontal cushion, said cushions including respectively mitered rear and bottom portions interengageable in said erect position of said back cushion to limit relative backward hinging movement of said back cushion, improved hinge structure comprising, a link at each side of said seat, means forming a pivot at each side of each cushion pivotally securing said links to said cushions, said pivots being displaced from the seating areas of said cushions, said links in erect position of said back cushion being displaced entirely below and rearwardly of said seating area including the juncture of the cushions in said seating areas, whereby to remain completely out of contact with the posterior of an occupant of the seat, and means providing a stop limiting downward swinging movement of said links when said back cushion is in said erect position, whereby to provide support in a vertical direction for said back cushion in said erect position thereof.

2. The combination defined in claim 1 wherein said stop comprises at each side of said horizontal cushion an element anchored to said horizontal cushion and positioned to be engaged by one of said links.

3. The combination defined in claim 1 wherein said seat portions adjacent said mitered rear and bottom portions have generally uniform thickness and the mitered edges thereof are generally equally angled, whereby to minimize irregular projections from the general contour of the seat in folded condition.

4. A construction as defined in claim 1 in which each link is a C-shaped member connected at each end to said pivots and lying entirely within the confines of the edges of said seat portions.

5. A folding seat construction comprising, a horizontal seat portion and a seat back portion interconnected by a hinge construction having a pivot on each seat portion and a link pivotally connected to each pivot, said seat portions having mitered edges which interengage in erect position of the seat back to limit backward swinging movement thereof, a stud anchored on said horizontal seat portion at a location downwardly and rearwardly of the pivot on said horizontal seat portion, said stud being positioned to be engaged by said link incident to movement of said link in a rearward direction when the seat back is raised to its erect position, said stud forming a support for said link restraining downward movement thereof, and thereby providing support in a vertical direction for said seat back in its erect position, said link being shaped to lie within the confines of the edges of said seat portions whereby to remain completely out of contact with the posterior of an occupant of the seat.

6. The combination defined in claim 5 wherein said link in erect position of said seat back has an upwardly extending end portion secured to the pivot on the seat back and has a forwardly extending end portion secured to the pivot on the horizontal seat portion.

7. The combination defined in claim 6 wherein said stud engages a lower edge of a central portion of said link in erect position of said seat back.

8. In a seat having cusion and a back cushion hinged thereto for movement selectively to an erect position for use and a fold position overlying said horizontal cushion, said cushions having respectively upper and forward seating areas, said cushions having respectively rear and bottom portions contoured to interengage when said back cushion is erect at a region disposed at a downward and rearward angle from the juncture of said seating areas to limit relative backward hinging movement of said back cushion, improved hinge structure comprising, a link at each side of said seat, means forming a pivot at each side of each cushion pivotally securing said links to said cushions, said pivots being displaced from said seating areas, said links in erect position of said back cushion being displaced entirely below and rearwardly of said seating areas including the juncture between said areas whereby to remain completely out of contact with the posterior of an occupant of the seat, and means providing a stop limiting downward swinging movement of said links when said back cushion is in said erect position whereby to provide support in a vertical direction for said back cushion in said erect position thereof.

9. The combination defined in claim 8 wherein said means providing said stop includes an element anchored at each side of said seat in movement-obstructive relation to said links.

10. The combination defined in claim 9 wherein said anchored element at each side of said seat comprises a stud anchored on said horizontal cushion.

11. The combination defined in claim 8 wherein said contured portion of each cushion is provided by means including a generally rigid frame, said pivots being anchored to said frames.

12. The combination defined in claim 11 wherein threaded apertures are provided in said means forming said frames, each of said pivots comprising a bolt forming a pivot stud passing through one of said links and being threaded into one of said apertures.

References Cited in the file of this patent

UNITED STATES PATENTS

| | | |
|---|---|---|
| 1,693,992 | Peterson | Dec. 4, 1928 |
| 1,701,684 | Lee | Feb. 12, 1929 |
| 2,067,559 | Bloom | Jan. 12, 1937 |
| 2,620,860 | McEntire | Dec. 9, 1952 |
| 2,767,775 | Nelson | Oct. 23, 1956 |